(12) United States Patent
Cowan

(10) Patent No.: US 11,105,512 B2
(45) Date of Patent: Aug. 31, 2021

(54) METHOD AND SYSTEM FOR CONTROLLING A FLOW CURVE OF AN ELECTROMECHANICAL GAS VALVE

(71) Applicant: Midea Group Co., Ltd., Foshan (CN)

(72) Inventor: Richard W. Cowan, Louisville, KY (US)

(73) Assignee: MIDEA GROUP CO., LTD, Foshan (CN)

( * ) Notice: Subject to any disclaimer, the term of this patent is extended or adjusted under 35 U.S.C. 154(b) by 166 days.

(21) Appl. No.: 15/941,890

(22) Filed: Mar. 30, 2018

(65) Prior Publication Data

US 2019/0301743 A1 Oct. 3, 2019

(51) Int. Cl.
  *F24C 3/12* (2006.01)
  *F16K 31/02* (2006.01)
  *G05D 7/06* (2006.01)

(52) U.S. Cl.
  CPC .............. *F24C 3/122* (2013.01); *F16K 31/02* (2013.01); *G05D 7/0652* (2013.01)

(58) Field of Classification Search
  CPC ........ F24C 3/122; F16K 31/02; G05D 7/0652
  USPC .............................................. 126/39 E, 39 N
  See application file for complete search history.

(56) References Cited

U.S. PATENT DOCUMENTS

| | | | |
|---|---|---|---|
| 3,726,296 A | 4/1973 | Friedland et al. | |
| 4,249,884 A | 2/1981 | Cade | |
| 4,498,863 A | 2/1985 | Hanson et al. | |
| 4,513,909 A | 4/1985 | Bartels | |
| 4,518,345 A | 5/1985 | Mueller et al. | |
| 5,234,196 A | 8/1993 | Harris | |
| 5,488,969 A | 2/1996 | King et al. | |
| 5,924,857 A | 7/1999 | Frasnetti et al. | |
| 5,984,663 A * | 11/1999 | Joyce ................... | F24H 3/0488 431/76 |
| 5,988,205 A | 11/1999 | Eggleston | |
| 6,016,832 A | 1/2000 | Vars et al. | |
| 6,206,687 B1 | 3/2001 | Redington | |
| 6,247,919 B1 | 6/2001 | Welz, Jr. et al. | |

(Continued)

FOREIGN PATENT DOCUMENTS

| | | | |
|---|---|---|---|
| CN | 201310941 Y | * | 9/2009 |
| CN | 201310941 Y | | 9/2009 |

(Continued)

OTHER PUBLICATIONS

Translation of CN-201310941-Y.*

(Continued)

*Primary Examiner* — Steven B McAllister
*Assistant Examiner* — Aaron H Heyamoto
(74) *Attorney, Agent, or Firm* — Middleton Reutlinger

(57) ABSTRACT

A cooking appliance includes, a gas cooking element; an electromechanical valve fluidly coupled with the gas cooking element to regulate a flow of gas to the cooking element; a manually-actuated user control movable over a range of positions; and a controller coupled to the user control and the electromechanical valve, the controller configured to determine a position of the manually-actuated user control within the range of positions and to control the electromechanical valve based at least in part upon the determined position to provide a controlled flow curve for the gas cooking element over the range of positions of the user control.

20 Claims, 7 Drawing Sheets

(56) References Cited

U.S. PATENT DOCUMENTS

| | | |
|---|---|---|
| 6,283,145 B1 | 9/2001 | Fenn |
| 6,314,992 B1 | 11/2001 | Ohmi et al. |
| 6,539,968 B1 | 4/2003 | White et al. |
| 7,360,534 B2 | 4/2008 | Krupp |
| 7,861,740 B2 | 1/2011 | Phallen et al. |
| 8,635,899 B2 | 1/2014 | Bailey |
| 8,752,577 B2 | 6/2014 | Santinanavat et al. |
| 8,863,734 B2 | 10/2014 | Shaffer |
| 9,453,648 B2 | 9/2016 | Schultz et al. |
| 9,638,425 B2 | 5/2017 | Inada et al. |
| 9,645,585 B2 | 5/2017 | Nguyen et al. |
| 9,657,946 B2 | 5/2017 | Young et al. |
| 9,951,960 B2 | 4/2018 | Spano |
| 10,240,789 B2 | 3/2019 | Deng |
| 10,532,821 B2 | 1/2020 | Freeth et al. |
| 2004/0055359 A1 | 3/2004 | Ketler et al. |
| 2005/0099256 A1* | 5/2005 | Subramanian ............ H01F 7/13 335/256 |
| 2006/0059987 A1* | 3/2006 | Melville ................. G01F 1/363 73/202.5 |
| 2008/0221822 A1 | 9/2008 | Laverdiere et al. |
| 2010/0112500 A1 | 5/2010 | Maiello et al. |
| 2010/0180882 A1* | 7/2010 | Oberhomburg ......... F24C 3/103 126/39 BA |
| 2016/0178213 A1* | 6/2016 | Petersen ................ F24C 3/103 126/39 E |
| 2016/0239026 A1 | 8/2016 | Nagase et al. |
| 2017/0009666 A1* | 1/2017 | Cano Wolff ............. F17D 1/04 |
| 2017/0322105 A1* | 11/2017 | Guixeras Nogue ......................... G01M 3/2807 |
| 2018/0008095 A1 | 1/2018 | Bennett et al. |
| 2018/0127109 A1* | 5/2018 | Freeth ...................... B64F 1/28 |
| 2018/0301301 A1* | 10/2018 | Bach ..................... H03K 17/97 |

FOREIGN PATENT DOCUMENTS

| | | |
|---|---|---|
| CN | 103867772 A | 6/2014 |
| CN | 106958666 A | 7/2017 |
| EP | 0833106 B1 | 11/2001 |
| EP | 1522790 A2 | 4/2005 |
| GB | 2362706 A | 11/2001 |
| KR | 20160127651 A | 11/2016 |
| KR | 20170017086 A | 2/2017 |
| WO | 2014091379 A1 | 6/2014 |

OTHER PUBLICATIONS

Valveuser Magazine, Issue 32, BVAA. Spring 2015.
Appliances Connection "Premier" www.appliancesconnection.com. First retrieved on Sep. 20, 2017.
International Search Report and Written Opinion of PCT Ser. No. PCT/CN2018/123151, dated Mar. 28, 2019.
Applied Control Concepts, Boiler Calibration, https://www.appliedcc.com/index.php/2011-07-25-22-49-08/combustion/25-combustion/calibrations/34-boiler-calibrations-article. Retrieved on Apr. 1, 2019.
B, Billy, Homebrew Academy, Brutus 10 Build: The Gas System, https://homebrewacademy.com/brutus-10-gas-system/, May 18, 2012, Retrieved on Apr. 1, 2019.

* cited by examiner

METHOD AND SYSTEM FOR CONTROLLING A FLOW CURVE OF AN ELECTROMECHANICAL GAS VALVE

BACKGROUND

Cooking today is in many respects as much an art as a science, and care must often be taken during cooking to ensure that food is neither overcooked nor undercooked, which often requires constant monitoring of a cooking appliance, e.g., a range, stovetop, oven, or the like. Cooking fundamentally involves applying cooking energy to food, e.g., through the application of heat, and it has been found that the rate at which energy is applied to food, as well as the duration, can have an appreciable effect on taste, texture and other physical properties of the food.

Gas valves are used to control the flow of gas to various household appliances, for example gas cooking ranges. Variable gas valves are generally used to enable a user to vary the flow of gas and thereby control the heating output of a gas cooking element such as a gas cooktop burner. Variable gas valves for example may be manually controllable by control knobs that vary flow rates through the valves between maximum and minimum rotational positions of the control knobs. It has been found, however, that many variable gas valves have non-linear flow curves between these maximum and minimum positions, resulting in an uneven change in heating output relative to movement of a control knob at different positions of the control knob. Thus, for example, movement of a control knob 5 degrees when the control knob is near the maximum flow rate position may change the heat output substantially more or less than movement of the same control knob 5 degrees when near the minimum flow rate position. Control over heating output may therefore be imprecise and may lead to poor cooking performance.

The flow curve of a valve, which is generally understood to be a map of the flow rate of the valve over its range of its operative positions, is typically fixed by the machining of the valve plug, and is generally limited by the size of the valve inlet or outlet or the largest flow path in the valve plug. Moreover, the flow curve may also be affected by the downstream cooking element (e.g., a cooktop burner) controlled by the valve, as smaller, lower output cooktop burners may support a lower flow rate than larger, higher output cooktop burners. As a result, a valve that is designed to support a larger, higher output cooktop burner may have a particularly undesirable flow curve when used with a smaller, lower output cooktop burner as the valve may have little effect on flow rate through a substantial portion of the valve's range of positions due to the fact that the primary restriction on flow is from the burner itself. This results in a control arrangement where the flow rate does not change appreciably over most of the range of operative positions, and then abruptly changes over a relatively small range of operative positions.

A need therefore continues to exist in the art for an improved manner of controlling the heating output of gas cooking elements in a cooking appliance.

SUMMARY

The herein-described embodiments address these and other problems associated with the art by providing in one aspect a cooktop that includes a plurality of gas burners; a plurality of electromechanical valves, each of which fluidly coupled with one of the plurality of gas burners to regulate a flow of gas thereto; one or more flow meters configured to measure gas flow to one or more of the plurality of gas burners; a plurality of manually-actuated control knobs, each of which rotatable over a range of positions; and a controller coupled to the plurality of manually-actuated control knobs, the plurality of electromechanical valves, and the one or more flow meters, where the controller is configured to determine a position of each of the plurality of manually-actuated control knobs within the range of positions and to control each of the plurality of electromechanical valves based on gas flow measured by the one or more flow meters in combination with the determined position of each the plurality of manually-actuated control knobs to provide linear flow curves for each of the plurality of gas burners over the range of positions of each of the plurality of manually-actuated user controls.

In some embodiments, the controller is further configured to detect a gas leak based on the gas flow measured by the one or more flow meters. In other embodiments, the controller is further configured to track gas consumption based on the gas flow measured by the one or more flow meters.

In another aspect, a cooking appliance is disclosed herein, where the cooking appliance includes a gas cooking element; an electromechanical valve fluidly coupled with the gas cooking element to regulate a flow of gas thereto; a manually-actuated user control movable over a range of positions; and a controller coupled to the manually-actuated user control and the electromechanical valve, the controller configured to determine a position of the manually-actuated user control within the range of positions and to control the electromechanical valve based at least in part upon the determined position to provide a controlled flow curve for the gas cooking element over the range of positions of the manually-actuated user control.

In some embodiments, the cooking appliance includes a cooktop and the cooking element is a burner.

In other embodiments, the cooking appliance further includes a plurality of electromechanical valves, a plurality of manually-actuated user controls, and a plurality of burners, where each of the plurality of electromechanical valves corresponds to a respective manually-actuated user control among the plurality of manually-actuated user controls, and where each of the plurality of electromechanical valves and respective manually-actuated user control further corresponds to a respective burner among the plurality of burners.

In some embodiments, the plurality of burners vary in size or output capacity. In other embodiments, the controlled flow curve is defined by a mapping of a relationship between positions of the plurality of manually-actuated user controls and settings of the plurality of electromechanical valves, and where the controller is configured to control the plurality of electromechanical valves by using the mapping to determine a setting for the electromechanical valve based on the size or output capacity of each burner of the plurality of burners.

In some embodiments, the cooking appliance includes an oven.

In some embodiments, the controlled flow curve is defined by a mapping of a relationship between positions of the manually-actuated user control and settings of the electromechanical valve, and where the controller is configured to control the electromechanical valve by using the mapping to determine a setting for the electromechanical valve. In other embodiments, the controlled flow curve is linear.

In some embodiments, the mapping is further based on a pressure sensor, where the pressure sensor is capable of detecting a change in pressure. In other embodiments, the controller is further configured to adjust the position of the electromechanical valve based on the change in pressure.

In some embodiments, the mapping is further based on a flow meter configured to measure a flow rate. In other embodiments, the controller is further configured to adjust the position of the electromechanical valve based on the measured flow rate. In still other embodiments, the controller is further configured to detect a gas leak based on the measured flow rate. In still yet other embodiments, the controller is further configured to track an amount of gas consumed by the appliance based on the measured flow rate.

In some embodiments, the manually-actuated user control is selected from a group consisting of a knob or a slider.

In some embodiments, the controller is further configured to control a minimum flow for the electromechanical valve over at least a portion of the range of positions of the manually-actuated user control based at least in part upon a size or output capacity of the gas cooking element. In other embodiments, the controller is further configured to control a minimum flow for the electromechanical valve over at least a portion of the range of positions of the manually-actuated user control based at least in part upon a type of gas supplied to the gas cooking element.

In yet another aspect, a method of controlling gas flow through a cooking appliance of the type including a gas cooking element and a manually-actuated user control movable over a range of positions may include determining, by a controller of the cooking appliance, a position of the manually-actuated user control within the range of positions; and controlling, by the controller, an electromechanical valve fluidly coupled with the gas cooking element based at least in part upon the determined position to provide a controlled flow curve for the gas cooking element over the range of positions of the manually-actuated user control.

In some embodiments, the cooking appliance includes a cooktop and the cooking element includes a burner. In other embodiments, the cooking appliance includes an oven.

In some embodiments, controlling the electromechanical valve further includes mapping, by the controller, a relationship between positions of the manually-actuated user control and positions of the electromechanical valve.

In some embodiments, the method further includes detecting, by the controller, a change in pressure by a pressure sensor of the cooking appliance, and adjusting, by the controller, in response to the detected change in pressure the position of the electromechanical valve.

In some embodiments, the method further includes measuring, by a flow meter configured to measure gas flow to one or more gas burners, a flow rate. In other embodiments, the method further includes adjusting, by the controller, the position of the electromechanical valve based on the measured flow rate. In still other embodiments, the method further includes detecting, by the controller, a gas leak from the cooking appliance based on the measured flow rate. In still yet other embodiments, the method further includes tracking, by the controller, an amount of gas consumed by the appliance based on the measured flow rate.

These and other advantages and features, which characterize the invention, are set forth in the claims annexed hereto and forming a further part hereof. However, for a better understanding of the invention, and of the advantages and objectives attained through its use, reference should be made to the figures, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
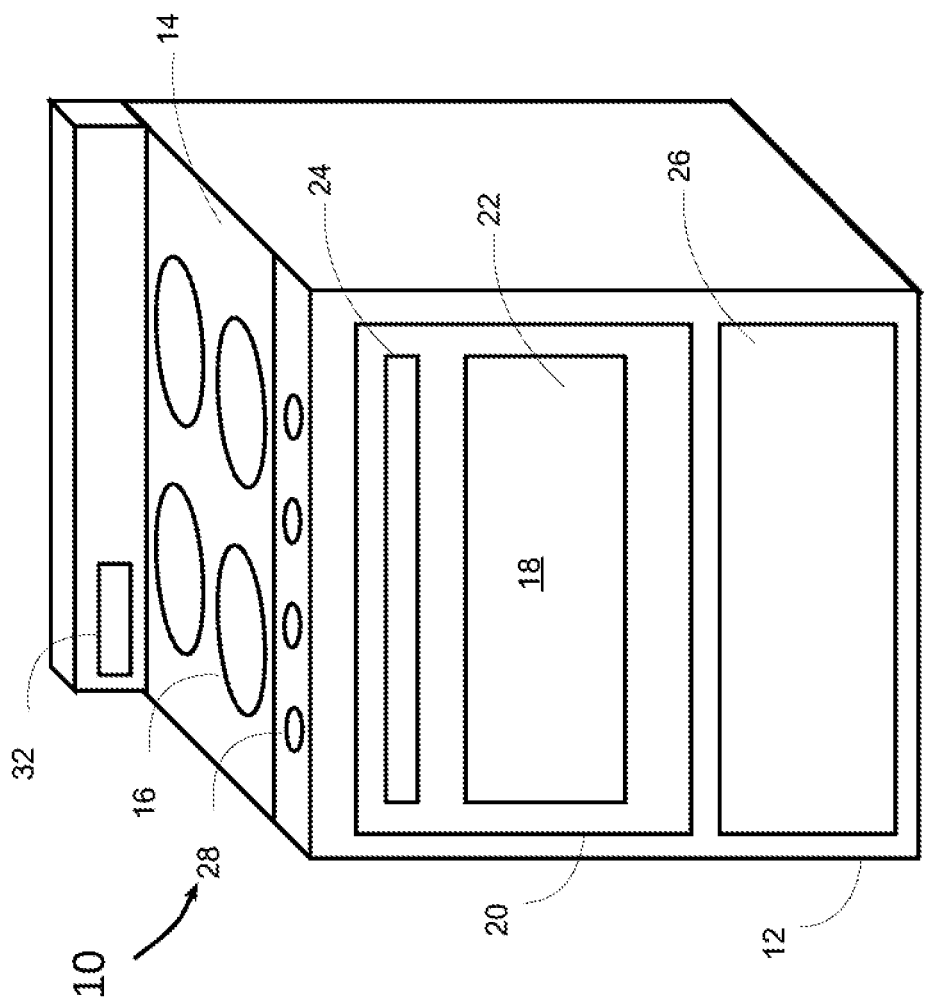
FIG. 1 is a perspective view of a cooking appliance consistent with some embodiments of the invention.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 12, a stovetop or cooktop 14 including a plurality of gas burners 16, and an oven 18 defining a cooking cavity accessed via an oven door 20 having a window 22 and a handle 24. Cooking appliance 10 may also include a storage drawer 26 in some embodiments, or in other embodiments, may include a second oven. Various cooking elements (not shown in FIG. 1) may also be incorporated into cooking appliance 10 for cooking food in oven 18, e.g., one or more gas heating elements.

Cooking appliance 10 may also include various manually-actuated user control devices, including, for example, control knobs 28 for controlling burners 16. It will be appreciated that cooking appliance 10 may include various types of manually-actuated control devices in other embodiments, including various combinations of switches, buttons, knobs and/or sliders, typically disposed at the rear or front (or both) of the cooking appliance.

Cooking appliance 10 may further include a display 32 for a timer, clock, and/or the like. Display 32 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers.

As noted above, cooking appliance 10 of FIG. 1 is a range, which combines both a stovetop or cooktop and one or more ovens, and which in some embodiments may be a standalone or drop-in type of range. In other embodiments, however, cooking appliance 10 may be another type of cooking appliance, e.g., a wall mount or freestanding oven, a drop-in stovetop or cooktop, etc. In general, a cooking appliance consistent with the invention may be considered to include any residential-type appliance including a housing and one or more gas cooking elements disposed thereon and/or therein and configured to generate energy for cooking food.

A cooking appliance consistent with the invention also generally includes one or more controllers configured to control the cooking elements and otherwise perform cooking operations at the direction of a user. In addition, as will become more apparent below, a controller of a cooking appliance in some embodiments may also control the flow of gas to the cooking elements.

Figure 2:
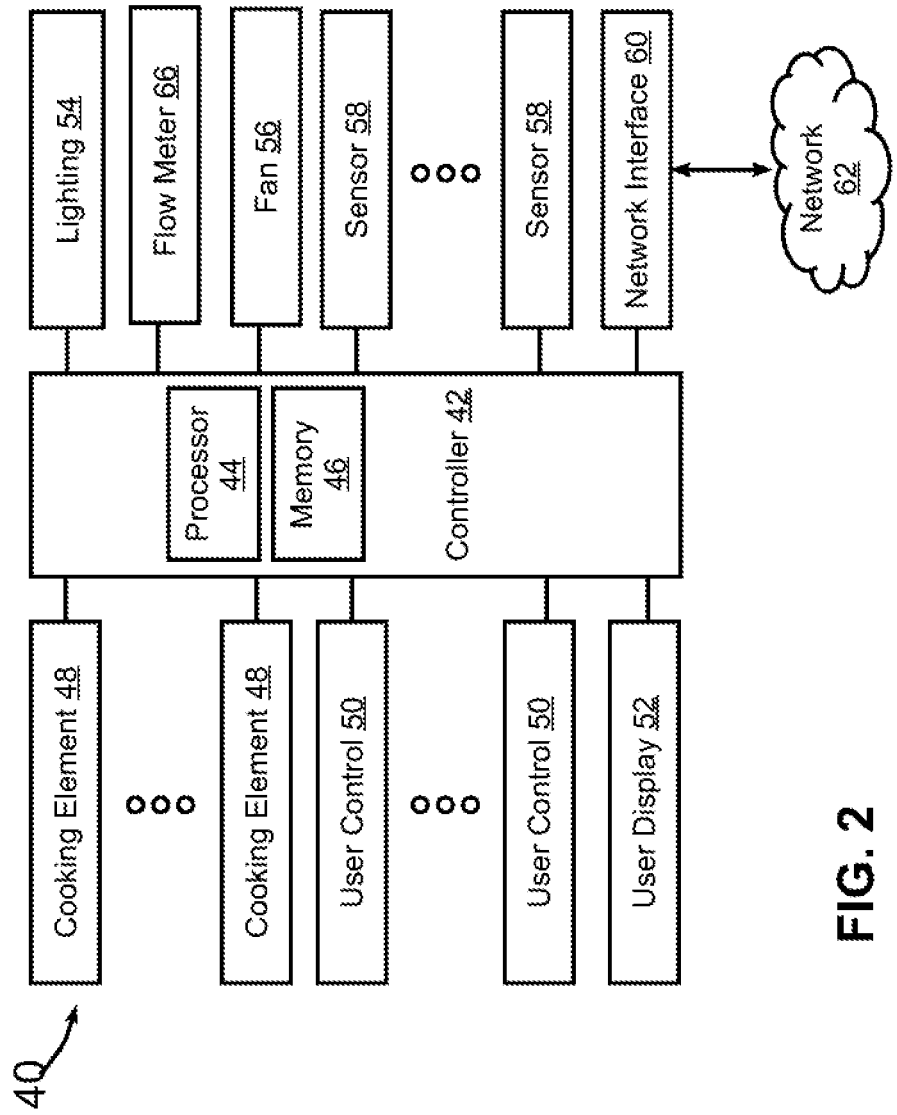
FIG. 2 is a block diagram of an example control system for a cooking appliance consistent with some embodiments of the invention.

FIG. 2, for example, illustrates an example embodiment of a cooking appliance 40 including a controller 42 that receives inputs from a number of components and drives a number of components in response thereto. Cooking appliance 40 may be implemented using practically any type of gas cooking appliance, e.g., a range, stovetop, single oven, double oven, wall oven, standalone oven, etc. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42.

As shown in FIG. 2, controller 42 may be interfaced with various components, including various gas cooking elements 48 used for cooking food (e.g. burners, oven heating elements, and the like), one or more manually-actuated user controls 50 for receiving user input (e.g., various combinations of switches, knobs, buttons, sliders, etc.), and a user display 52 (including various indicators, graphical displays, textual displays, speakers, etc.), as well as various additional components suitable for use in a cooking appliance, e.g., lighting 54 and/or one or more fans 56 (e.g., convection fans, cooling fans, etc.), among others. It will be appreciated, for example, that controller 42 may be interfaced with each gas cooking element 48 to control one or both of an igniter to ignite gas supplied to the cooking element and an electromechanical valve that regulates gas flow to the cooking element.

Controller 42 may also be interfaced with various sensors 58 located to sense environmental conditions inside of and/or external to cooking appliance 40, e.g., one or more pressure sensors, temperature sensors, humidity sensors, air quality sensors, smoke sensors, carbon monoxide sensors, odor sensors and/or electronic nose sensors, among others. Such sensors may be internal or external to cooking appliance 40, and may be coupled wirelessly to controller 42 in some embodiments. Additionally, controller may be interfaced with one or more flow meters 66 that may measure the flow of gas, either to individual cooking elements or to various combinations of cooking elements (e.g., one flow meter to monitor overall gas flow to the appliance, multiple flow meters to monitor the gas flow to each individual cooking element, etc.)

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, and various communication protocols may be supported, including various types of home automation communication protocols. In other embodiments, other wireless protocols, e.g., Wi-Fi or Bluetooth, may be used.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-2 will be apparent to one of ordinary skill in the art, as will become apparent from the description below. Therefore, the invention is not limited to the specific implementations discussed herein.

Figure 3:
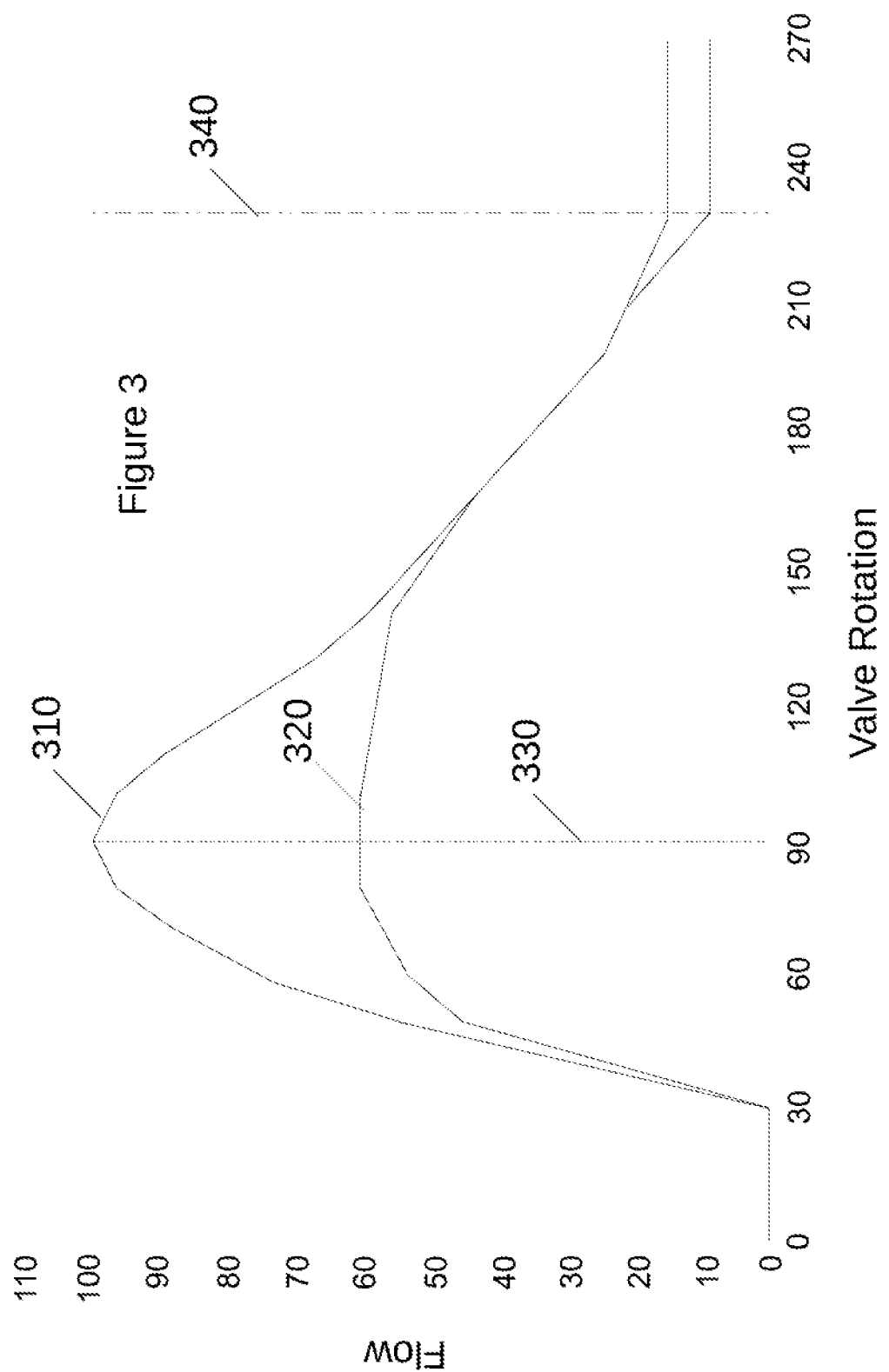
FIG. 3 illustrates a graph of an example flow curve for a gas valve utilized with a large burner and an example flow curve for the same gas valve utilized with a small burner.

Referring now to FIG. 3, this figure illustrates an embodiment of a flow curve for a gas valve utilized with a large capacity burner 310 of a cooking appliance and a flow curve for the same size and type of gas valve utilized with a small capacity burner 320 of a cooking appliance. As is evident from flow curves 310, 320 illustrated in FIG. 3, the flow curves are non-linear, e.g., at least within the operational range of about 30 to about 230 degrees of rotation. In addition, it will be appreciated that at the tail end (approximately 235 to 270 degrees of rotation) of the flow curve illustrated in FIG. 3 effectively defines the minimum flow setting for the burner in an active state. This minimum flow may be set by a fixed size orifice in some instances, while in other instances, an adjustable orifice or a replaceable orifice may be provided in the valve to control the minimum flow appropriate for the burner size, as well as to allow for the valve to be configured for use with different gases (e.g. natural gas, propane, or the like). Traditionally, flow curves for manual gas valves of cooking appliances are fixed by the machining of the valve and are limited by the maximum flow supported by the orifice of the valve or by an input or output of the valve (represented by line 330). The flow curve for each burner is the flow rate of the valve with respect to the valve's angle of rotation, or rotational position. Conventionally, a flow curve for a manual gas valve provides for more accurate adjustment for a large capacity burner at the expense of lower capacity burners; this is due to the same valve being used for all burners on the range. Because the same type of valve is used for each burner, each valve has to have enough capacity for the largest capacity burner; thus, when applied to a smaller capacity burner the flow curve is significantly truncated, resulting in a flow curve near a small burner's maximum capacity for most of the range of valve rotation, and the flow dropping off rapidly to a minimum flow near the end of the rotation spectrum (represented by line 340).

Figure 4:
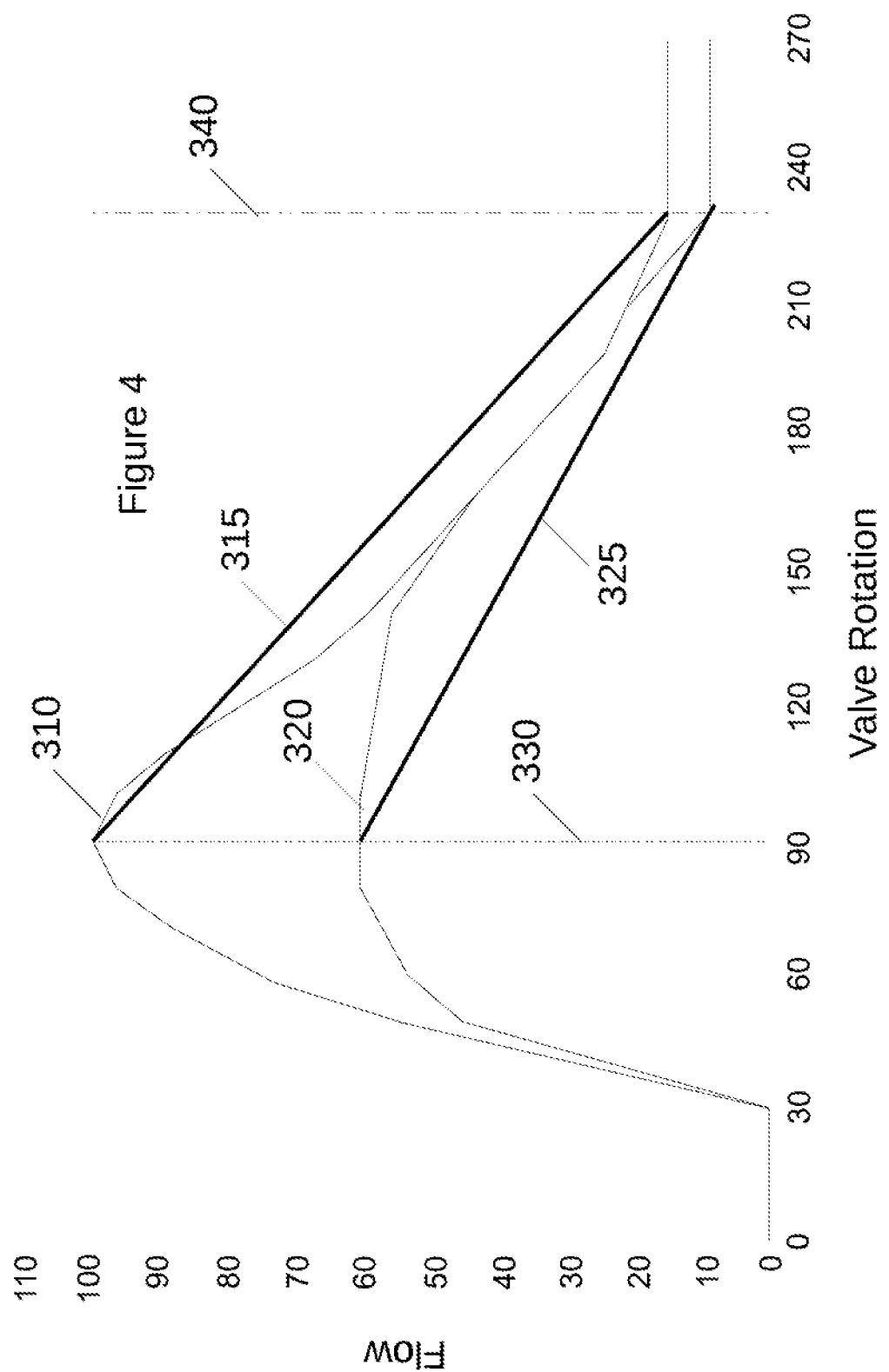
FIG. 4 illustrates a superimposition of a simulated linear relationship between a user-actuated control device and the burner flow rate onto the graph of FIG. 3.

However, from a consumer and usability perspective it may be desirable for there to be a linear, or otherwise controlled curve. For example, it may be desirable for a valve to flow at about X % of capacity when a user, for example, turns a manually-actuated knob about X % of the range from the minimum flow position to the maximum flow position. As such, it may be desirable to map a controlled relationship (e.g. a substantially linear relationship) between varying positions of the manually-actuated user controls, such as knobs, and the settings of the valves. Referring now to FIG. 4, a non-limiting example of such a linear mapping is superimposed on the flow curves for illustrate purposes. Lines 315, 325 represent an example of a simulated linear relationship between the user-actuated controller and burner flow for the small and large burner, respectively.

As discussed above, an adjustable orifice or a replaceable orifice may be provided in order to control the minimum flow appropriate for the burner size and/or to allow for the valve to be configured for use with different gases (e.g. natural gas, propane, or the like). In some embodiments, it may be desirable to provide a flow curve that controls the minimum flow for the valve, so as to provide, through electronic control, a similar function to an adjustable or replaceable orifice that configures a valve for a particular burner size and/or type of fuel. Such electronic control of the minimum flow for the valve may even enable a valve design to omit additional hardware to support an adjustable or replaceable orifice.

Figure 5:
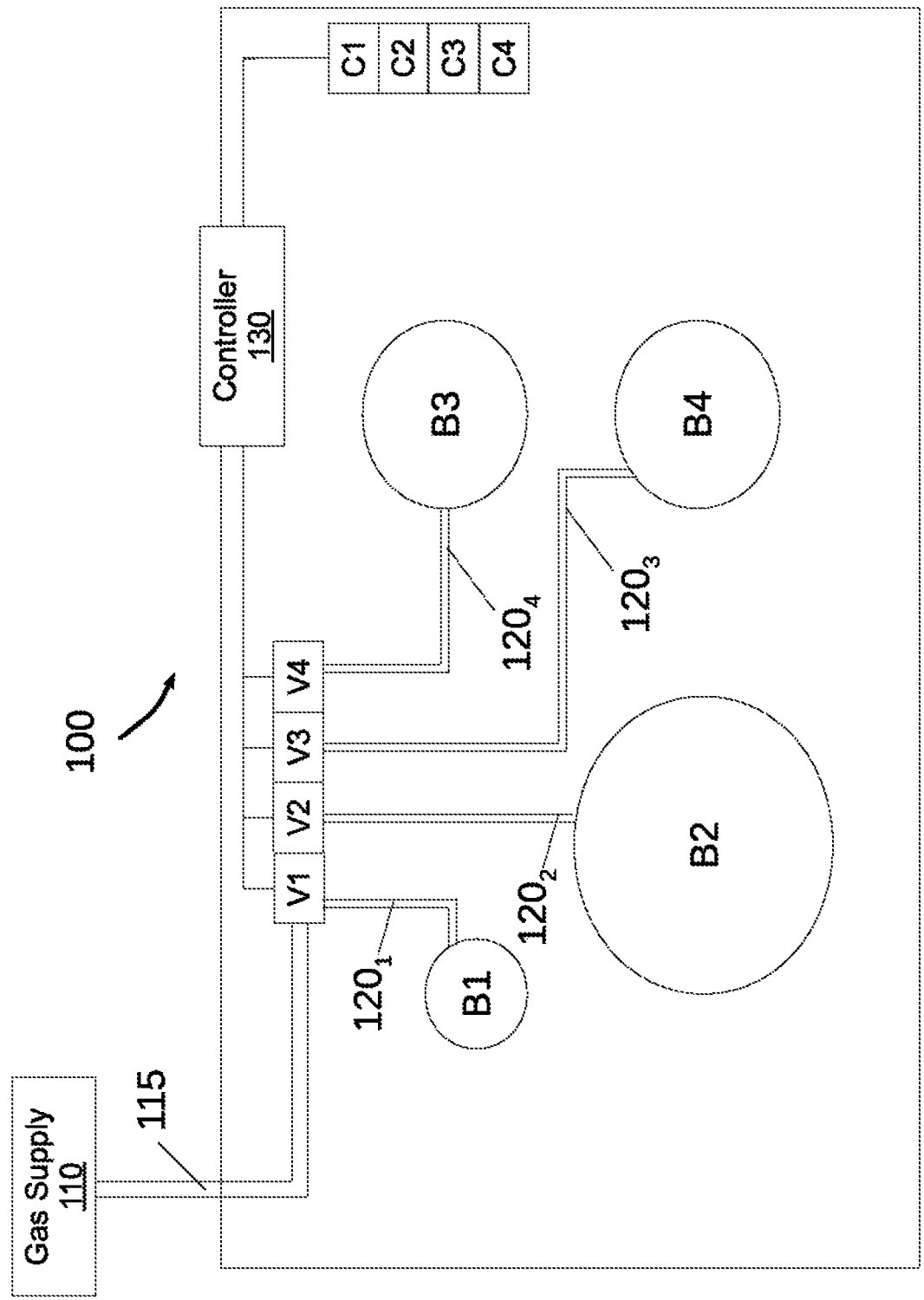
FIG. 5 illustrates a system for controlling a flow curve of an electromechanical gas valve consistent with some embodiments of the invention.

Referring now to FIG. 5, an exemplary embodiment of a cooktop 100 consistent with the description herein is illustrated. A gas supply 110 may be fed into the cooktop system, through piping, tubing 115, or the like to one or more electromechanical valves V1, V2, V3, V4. In some embodiments, each electromechanical valve V1, V2, V3, V4 may further include a stepper motor, which divides a full rotation of the valve into a number of equal steps, allowing for fine adjustment of the electromechanical valve. In some embodiments, the stepper motor may be a 400 step motor, but this is not to be understood as limiting, as the number of steps may vary. In some embodiments, such as illustrated, there may be four valves V1, V2, V3, V4; in other embodiments, the number of valves may vary. The number, capacity, and/or the arrangement of the electromechanical valves are not intended to be limiting, as a person of ordinary skill in the art would recognize these may vary based on user desire, costs, design aesthetics, or any number of other considerations.

Each burner B1, B2, B3, B4 may be fluidly coupled to the one or more electromechanical valves V1, V2, V3, V4 respectively, where the electromechanical valves V1, V2, V3, V4 are configured to regulate the flow of gas to each of the gas burners B1, B2, B3, B4. This fluid coupling may be through the use of piping or tubing $120_{1-4}$ running between each valve V1, V2, V3, V4 and each burner B1, B2, B3, B4. As illustrated in FIG. 5, the cooktop 100 has a plurality of burners B1, B2, B3, B4 of varying output capacity, as illustrated by their relative size; burner B1 is a small capacity burner, burners B3, B4 are medium capacity burners, and burner B2 is a large capacity burner. In some embodiments, the cooktop may contain a varying number of burners, for example some cooktops may only contain one or two burners, while other cooktops may contain six or more burners. In other embodiments, the burners of the cooktop may vary in size or output capacity, for example some cooktops may contain burners of identical capacity, while other cooktops may contain only two different capacity burners. In still other embodiments, the arrangement of the burners may also vary from the illustration of FIG. 5. The number, capacity, and/or the arrangement of the burners are not intended to be limiting, as a person of ordinary skill in the art would recognize these may vary based on user desire, costs, design aesthetics, or any number of other considerations.

The cooktop 100 may further include a plurality of manually-actuated user controls C1, C2, C3, C4, each of which may be movable over a range of positions. Such a range of positions may include only a portion of the full range of movement of a control in some embodiments. For example, in some embodiments, the manually-actuated user control may be a control knob. In some embodiments, such a control knob may be capable of a full 360 rotation; in other embodiments, the control knob may only rotate over a portion or subset of the possible positions. In other embodiments, the manually-actuated user control may be slider that slides over the range of positions, or various other types of variable controls capable of outputting a variable control signal within a range of values. It will be appreciated that a controlled flow curve may be defined therefore over a full range of motion for a control in some embodiments, or only for a subset of the range of motion for a control in other embodiments.

The cooktop 100 may additionally include a controller 130 that is coupled to each of the manually-actuated user controls C1, C2, C3, C4 and to each of the electromechanical valves V1, V2, V3, V4. This coupling may be wired, as illustrated in FIG. 4, or may be wireless. The controller 130 may be configured to determine what position each of the manually-actuated user controls C1, C2, C3, C4 is in, within all possible positions. For example, the controller 130 may determine that burner B1 is off, burner B2 is on and turned 180 degrees, burner B3 is off, and burner B4 is on and turned 210 degrees. The controller 130 may control each electromechanical valve V1, V2, V3, V4 based on the determined position of each of the manually-actuated user controls C1, C2, C3, C4. The controller 130 controls each of the electromechanical valves V1, V2, V3, V4 so as to provide a controlled relationship between the flow of gas from the valves V1, V2, V3, V4 to the each of the burners B1, B2, B3, B4 and the position of each the manually-actuated user controls C1, C2, C3, C4. It will be appreciated that in this embodiment, each valve V1, V2, V3, V4 is controlled based upon the position of the respective corresponding control C1, C2, C3, C4, and as such, each valve may be controlled independently of the state of any other valve in the cooking appliance. In other embodiments, however, the state of each valve may be used as an input to control the state of another valve, e.g., to effectively adjust the flow curve of one valve based upon the state of one or more valves in the appliance. Moreover, in some embodiments, only a subset of the cooking elements in a cooking appliance may be controlled in the herein-described manner, with other cooking elements controlled in a different manner.

Figure 6:
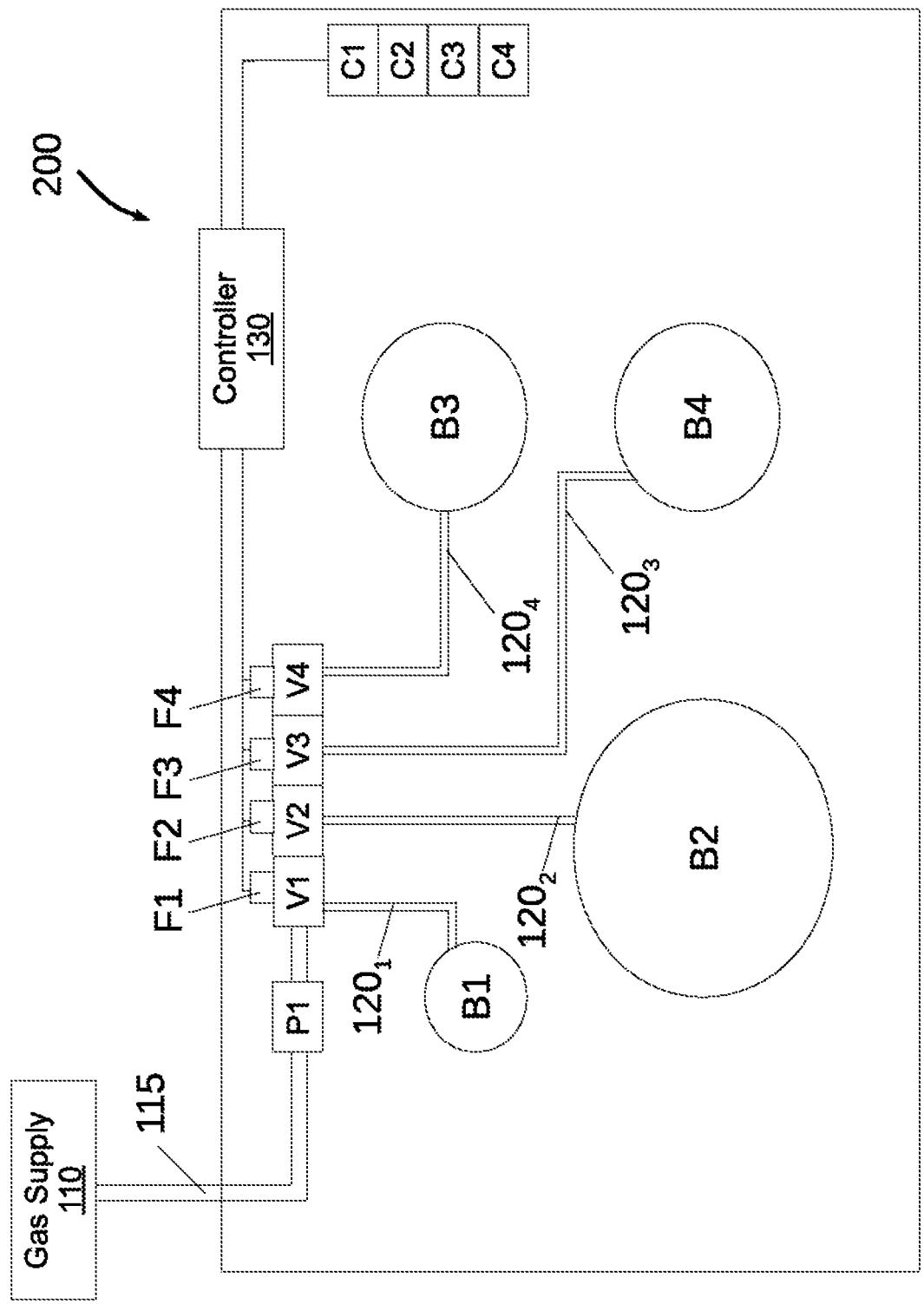
FIG. 6 illustrates another system for controlling a flow curve of an electromechanical gas valve consistent with some embodiments of the invention.

Referring now to FIG. 6, another exemplary embodiment of a cooktop 200 consistent with the description herein is illustrated, and including one or both of a flow meter and a pressure sensor as additional inputs for controlling the flow curves of one or more electromechanical valves. The embodiment of FIG. 5 is identical to the embodiment of a cooktop 100 illustrated in FIG. 4, with the exception of the inclusion of one or more flow meters F1, F2, F3, F4 and a pressure sensor P1; therefore, like numbers will be used to identify like structures. The one or more flow meters F1, F2, F3, F4 illustrated in FIG. 5 are configured to measure the flow of gas to one or more of the burners B1, B2, B3, B4. In some embodiments, such as illustrated in FIG. 5, the number of flow meters F1, F2, F3, F4 may correspond to the number of burners B1, B2, B3, B4; however, in other embodiments, this may not be the case. For example, in some embodiments, there may be only a single flow meter for the entire cooking apparatus. Furthermore, although illustrated as positioned adjacent the electromechanical valves V1, V2, V3, V4 in FIG. 5 this is not intended to be limiting, as the one or more flow meters F1, F2, F3, F4 may be positioned anywhere between the gas supply 110 and the burners B1, B2, B3, B4 in other embodiments.

Gas flow measurements from the one for more flow meters F1, F2, F3, F4 may be used to detect and/or track various items about the cooktop 200 system. For example, in some embodiments, the controller 130 may be configured to detect a gas leak from the cooking appliance 200 based on the gas flow measurement(s) from the one or more flow meters F1, F2, F3, F4. The controller 130 may further alert a user to the gas leak through a visual, audio, or any other type of suitable alarm and/or may be configured to automatically shut off a gas supply to the appliance (e.g., by controlling a master valve). In other embodiments, the controller 130 may be configured to track energy or gas consumption of the cooking appliance based on measurements from the one or more flow meters F1, F2, F3, F4, and the controller 130 may then provide this information to a user, e.g., through a display or through an external device.

In some embodiments, the controller 130 may be configured to use the measured flow rate from the one or more flow meters F1, F2, F3, F4 in combination with the determined position of each the one or more of manually-actuated user controls to control the position of the electromechanical valves V1, V2, V3, V4. This may allow for real-time adjustments of valve V1, V2, V3, V4 positions to accommodate for concurrent use of multiple burners.

Although described and illustrated as having four flow meters F1, F2, F3, F4, this is not to be understood as limiting. In some embodiments, the cooktop 100 may only have a single flow meter for the entire system, or may omit a flow meter entirely. With this single flow sensor a calibration procedure may be used to determine appropriate flow curves for each valve based upon measured flows. For example, such a calibration may be performed in some embodiments by turning a large burner on high and measuring the flow and then making assumptions about the flow based on that measurement and calibrate accordingly for all burners.

In some alternative embodiments, a pressure sensor P1 may be configured to detect a change in pressure, which might occur, for example, as burners B1, B2, B3, B4 are turned on or turned off. Conventionally, as multiple burners of a cooktop are turned on, the pressure to each individual burner may decrease, thus in order to maintain the desired flow, the valve may need to be opened more to compensate for the drop in pressure. In embodiments, the controller 130 may be configured to adjust the position of the one or more electromechanical valves V1, V2, V3, V4 based on this detected change in pressure so that the desired controlled relationship is maintained based on the mapping. Although FIG. 6 is illustrated as including both one or more flow meters F1, F2, F3, F4 and a pressure sensor P1, this is not to be understood as limiting. A cooking appliance consistent with the disclosure herein may only include one or more flow meters F1, F2, F3, F4, or may only include a pressure sensor P1.

Referring now to FIG. 4, which illustrates an embodiment of a mapping of the relationship between various positions of one of the manually-actuated user controls and the rotation of the electromechanical valves, where a simulated linear mapping is superimposed over the flow curve of FIG. 3. Such a mapping may function to generate a controlled relationship, for example a linear relationship, between the electromechanical valve flow and the position of the manually-actuated controls. In this embodiment, the simulated linear relationships between the gas flow and the valve rotation are shown for both large capacity burners 315 and small capacity burners 325.

As a non-limiting example of the functioning of the exemplary mapping of FIG. 5, assume a user has turned a knob of a manually-actuated user control C1 in order to direct gas to flow at 50% of the maximum of the small capacity burner B1. As illustrated in FIGS. 3 and 4, the maximum capacity of the exemplary small burner is a flow of 60% of the maximum flow normalized to the largest burner of the system; therefore, 50% capacity may be a flow of 30% of the maximum flow normalized to the largest burner of the system. As illustrated in FIG. 4, the flow curve for the small burner 320 reaches a flow of 30 when the valve is rotated about 190 degrees; thus, in order to map a linear relationship between the position of the user-actuated control C1 with the electromechanical valve V1 rotation, the valve V1 may be rotated to 190 degrees, even though the manually-actuated user control knob C1 was only positioned at 50%. Further assume a user has turned a knob of a manually-actuated user control C2 in order to direct gas to flow at 50% of the maximum of the large capacity burner B2. As illustrated in the exemplary embodiments of FIGS. 3 and 4, the maximum capacity of the exemplary large burner is a flow of 100% of the maximum flow; therefore, 50% capacity would be a flow of 50% of the maximum flow. As illustrated in FIG. 4, the flow curve for the large burner 310 reaches a flow of 50 when the valve is rotated about 160 degrees; thus, in order to map a linear relationship between the position of the user-actuated control C2 with the electromechanical valve V2 rotation, the valve V2 may be rotated to 160 degrees, even though the manually-actuated user control knob C1 was positioned at 50%. Although illustrated and described as linear, this is not intended to be limiting. Any type of desired controlled relationship may be mapped using the techniques described herein.

Another non-limiting example of mapping of the relationship between various positions of one of the manually-actuated user controls and the rotation of the electromechanical valves is illustrated in Table 1 below. Table 1 provides a mapping of the relationship between ten rotational positions (1-10) of user controls and the corresponding rotation of the electromechanical valves for both the larger burner and the small burner of the flow curves illustrated in FIGS. 3 and 4 in order to create a controlled relationship, in this instance a substantially linear relationship.

TABLE 1

| Control Knob Position | Valve Position Setting for Large Burner (in degrees) | Valve Position Setting for Small Burner (in degrees) |
| --- | --- | --- |
| 1 | N/A | N/A |
| 2 | 215 | 225 |
| 3 | 190 | 215 |
| 4 | 170 | 200 |

TABLE 1-continued

| Control Knob Position | Valve Position Setting for Large Burner (in degrees) | Valve Position Setting for Small Burner (in degrees) |
|---|---|---|
| 5 | 160 | 190 |
| 6 | 140 | 180 |
| 7 | 130 | 170 |
| 8 | 115 | 160 |
| 9 | 110 | 145 |
| 10 | 90 | 90 |

Table 1 provides a control knob position between one and ten, which may be, in some embodiments, displayed on the control knob itself. Although the control knob position in Table 1 is between one and ten, this is not intended to be limiting, the control knob setting may include more or less settings and/or may alternatively be in the form of percentages or other markers (e.g. "high," "medium," and "low"). In addition, rather than defining control knob positions based upon arbitrary labels, the control knob positions may be based on rotational position in some embodiments, or, for example, where a control knob drives a potentiometer, a voltage or current, or practically any other control signal that varies over a range of positions of a control.

In some embodiments, the controller 130 may contain this mapping preprogramed from a manufacturer based on known flow rates from the valves at varying rotations. In other embodiments, the controller 130 may perform the mapping in real-time in response to the measured flow rates and/or pressure measurements described herein, or any other information that may be available to the controller 130. For example, a pressure sensor P1 and/or one or more flow meters F1, F2, F3, F4 may sense a drop in pressure and/or flow when all burners are turned on and the controller 130 may then adjust the mapping accordingly so that the desired controlled relationship is maintained. In still other embodiments, the controller 130 may use a combination of preprogramming and real-time adjustment of the system to map the desired controlled relationship.

Figure 7:
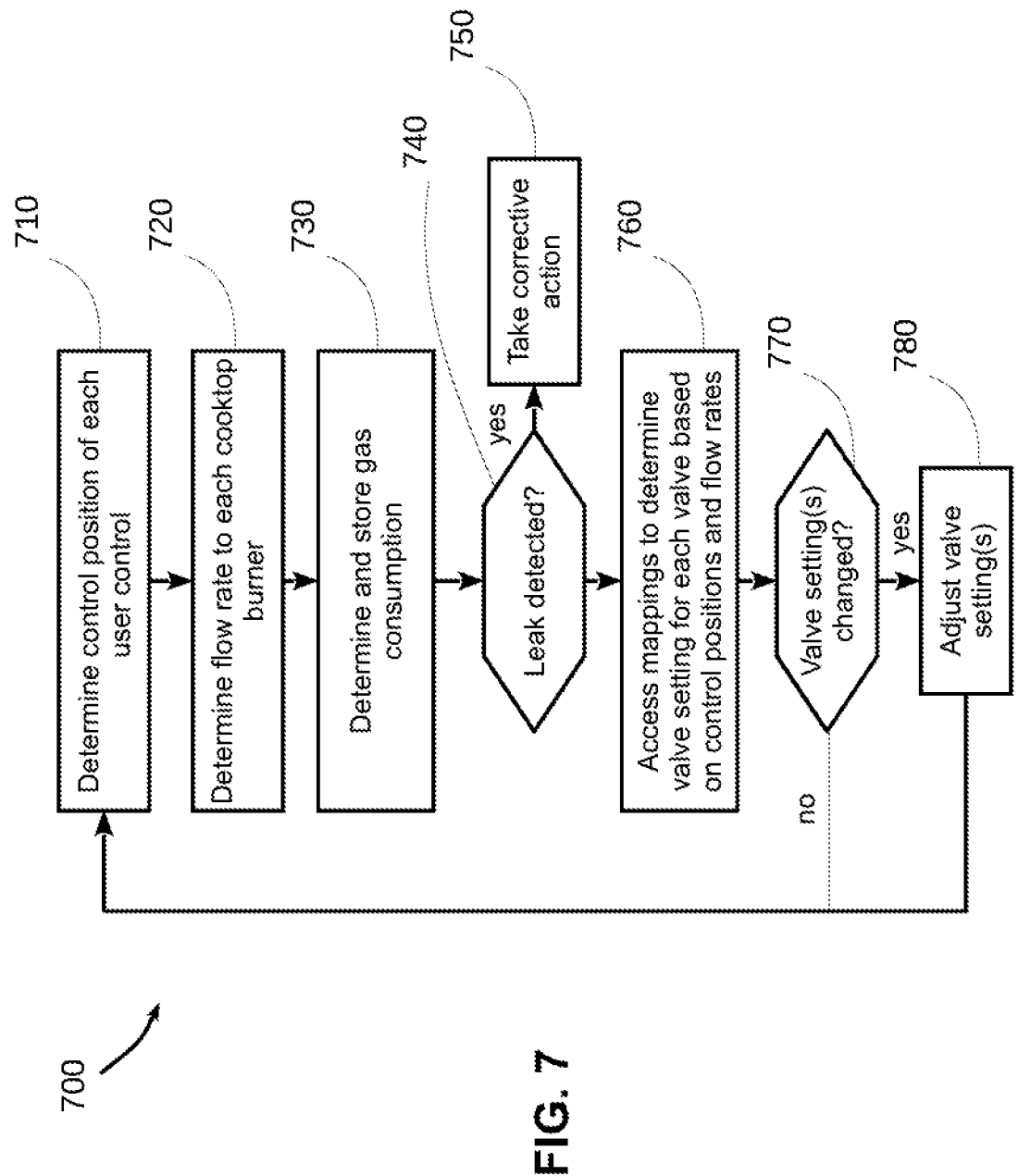
FIG. 7 is a flowchart illustrating an example embodiment of a routine for controlling gas flow through a cooking appliance.

Referring now to FIG. 7, an embodiment of a routine 700 for controlling the flow of gas through a cooking appliance (e.g. a cooktop, range, etc.) described herein is illustrated. Routine 700 may be implemented, for example, by a controller of a cooking appliance, e.g., controller 42 or 130 discussed above. At block 710 the controller may determine the position of each of the one or more manually-actuated user controls within a range of possible positions. In some embodiments, the manually-actuated user control may be a control knob, which may rotate over the range of positions. In other embodiments, the manually-actuated user control may be slider that slides over the range of positions. At block 720, the controller may determine the flow rate to each cooktop burner. This may be accomplished through the use of one or more flow meters positioned between the gas supply and the burner(s). At block 730, the controller may determine and store an amount (e.g. a volume) of gas consumed by the cooking appliance. This determination may also be accomplished through the one or more flow meters. The controller may then determine if a gas leak is detected, see block 740. Where a leak is detected, a corrective action may be taken, block 750. In some embodiments, this corrective action may be in the form of some type of an alarm (audio, visual, message, etc.) to a user, and/or may include shutting off gas flow to a burner and/or to the appliance itself.

Where no gas leak is detected, at block 760, the controller may access one or more mappings in order to determine a setting for each of the electromechanical valve(s) based on the positions of the one or more manually-actuated user controls and the one or more flow rates. This mapping may be in the form of a flow curve, table, function, algorithm, or the like. At block 770, the controller may determine if one or more of the electromechanical valves need to be adjusted in order to meet the newly determined valve settings. If not, control may return to block 710 to repeat the aforementioned operations, e.g., in a subsequent monitoring interval. If the settings of one or valves have changed, however, block 770 passes control to block 780 to adjust each changed valve to its new setting (e.g., by energizing the stepper motor therefor), and then returning control to block 710.

In some embodiments, the controller may control the one or more electromechanical valves by mapping a relationship between positions of the manually-actuated user controls and the rotation or position of the electromechanical valves. In some embodiments, this mapping may be through use of a flow curve (as illustrated herein). In other embodiments, the mapping may be through use of a table or a chart. In still other embodiments, the mapping may be through the use of an algorithm or function to calculate the necessary components of the desired controlled relationship. These embodiments are not intended to be limiting, any type of mapping known in the art.

Various additional modifications may be made to the illustrated embodiments consistent with the invention. Therefore, the invention lies in the claims hereinafter appended.

What is claimed is:

1. A cooktop, comprising:
    a plurality of gas burners;
    a plurality of electromechanical valves, each of which fluidly coupled with one of the plurality of gas burners to regulate a flow of gas thereto;
    one or more flow meters configured to measure gas flow to one or more of the plurality of gas burners;
    a pressure sensor configured to detect a change in pressure;
    a plurality of manually-actuated control knobs, each of which rotatable over a range of positions; and
    a controller coupled to the plurality of manually-actuated control knobs, the plurality of electromechanical valves, the pressure sensor, and the one or more flow meters,
    wherein the controller is configured to determine a position of each of the plurality of manually-actuated control knobs within the range of positions and to control each of the plurality of electromechanical valves based on a combination of (a) change in pressure measured by the pressure sensor, (b) gas flow measured by the one or more flow meters and (c) the determined position of each the plurality of manually-actuated control knobs to provide linear flow curves for each of the plurality of gas burners over the range of positions of each of the plurality of manually-actuated user controls.

2. The cooktop of claim 1, wherein the controller is further configured to detect a gas leak based on the gas flow measured by the one or more flow meters.

3. The cooktop of claim 1, wherein the controller is further configured to track gas consumption based on the gas flow measured by the one or more flow meters.

4. A cooking appliance, comprising:

a gas cooking element;

an electromechanical valve fluidly coupled with the gas cooking element to regulate a flow of gas thereto and having a non-linear flow curve across a range of valve positions;

a manually-actuated user control movable over a range of positions; and a controller electrically coupled to the manually-actuated user control and the electromechanical valve, the controller configured to determine a position of the manually-actuated user control within the range of positions and to control the electromechanical valve based at least in part upon the determined position to provide a controlled flow curve for the gas cooking element over the range of positions of the manually-actuated user control that differs from the non-linear flow curve of the electromechanical valve, wherein the controlled flow curve is defined by a predetermined mapping of a relationship between positions of the manually-actuated user control and settings of the electromechanical valve, and wherein the controller is configured to control the electromechanical valve by using the mapping to determine a setting for the electromechanical valve.

5. The cooking appliance of claim 4, wherein the cooking appliance includes a cooktop and the cooking element is a burner.

6. The cooking appliance of claim 5, further comprising a plurality of electromechanical valves, a plurality of manually-actuated user controls, and a plurality of burners, wherein each of the plurality of electromechanical valves corresponds to a respective manually-actuated user control among the plurality of manually-actuated user controls, and wherein each of the plurality of electromechanical valves and respective manually-actuated user control further corresponds to a respective burner among the plurality of burners.

7. The cooking appliance of claim 6, wherein the plurality of burners vary in size or output capacity.

8. The cooking appliance of claim 7, wherein the controller is configured to determine the setting for the electromechanical valve using the mapping further based on the size or output capacity of each burner of the plurality of burners.

9. The cooking appliance of claim 4, wherein the cooking appliance includes an oven.

10. The cooking appliance of claim 4, wherein the predetermined mapping is preprogrammed by a manufacturer.

11. The cooking appliance of claim 4, wherein the controlled flow curve is linear.

12. The cooking appliance of claim 4, wherein the mapping is further based on a pressure sensor, wherein the pressure sensor is capable of detecting a change in pressure.

13. The cooking appliance of claim 12, wherein the controller is further configured to adjust the position of the electromechanical valve based on the change in pressure.

14. The cooking appliance of claim 4, wherein the mapping is further based on a flow meter configured to measure a flow rate.

15. The cooking appliance of claim 14, wherein the controller is further configured to adjust the position of the electromechanical valve based on the measured flow rate.

16. The cooking appliance of claim 14, wherein the controller is further configured to detect a gas leak based on the measured flow rate.

17. The cooking appliance of claim 14, wherein the controller is further configured to track an amount of gas consumed by the appliance based on the measured flow rate.

18. The cooking appliance of claim 4, wherein the manually-actuated user control is selected from a group consisting of: a knob or a slider.

19. The cooking appliance of claim 4, wherein the controller is further configured to control a minimum flow for the electromechanical valve over at least a portion of the range of positions of the manually-actuated user control based at least in part upon a size or output capacity of the gas cooking element.

20. The cooking appliance of claim 4, wherein the controller is further configured to control a minimum flow for the electromechanical valve over at least a portion of the range of positions of the manually-actuated user control based at least in part upon a type of gas supplied to the gas cooking element.

* * * * *